(12) United States Patent
Young

(10) Patent No.: US 7,310,046 B2
(45) Date of Patent: Dec. 18, 2007

(54) METHOD FOR ELIMINATING READING ERRORS IN A NON-CONTACT MICROWAVE SOLIDS FLOW METER

(75) Inventor: Gary C. Young, Cedar Rapids, IA (US)

(73) Assignee: GYCO, Inc., Cedar Rapids, IA (US)

( * ) Notice: Subject to any disclaimer, the term of this patent is extended or adjusted under 35 U.S.C. 154(b) by 221 days.

(21) Appl. No.: 11/264,554

(22) Filed: Nov. 1, 2005

(65) Prior Publication Data
US 2007/0100575 A1 May 3, 2007

(51) Int. Cl.
*G08B 21/00* (2006.01)

(52) U.S. Cl. .................. 340/606; 73/861; 73/861.41; 73/61.41

(58) Field of Classification Search .......... 340/606
See application file for complete search history.

(56) References Cited

U.S. PATENT DOCUMENTS

| | | | |
|---|---|---|---|
| 4,065,675 A * | 12/1977 | Gold | ................ 250/576 |
| 4,091,385 A | 5/1978 | Petlevich et al. | |
| 5,550,537 A * | 8/1996 | Perdue | ............... 340/870.01 |
| 5,986,553 A * | 11/1999 | Young | ..................... 340/606 |
| 6,404,344 B1 | 6/2002 | Young | |
| 6,988,857 B2 * | 1/2006 | Kroemmer et al. | ......... 406/34 |

* cited by examiner

*Primary Examiner*—Charles D. Garber
*Assistant Examiner*—Kerri L McNally
(74) *Attorney, Agent, or Firm*—Slater & Matsil, L.L.P.

(57) ABSTRACT

Method for eliminating or reducing reading errors of a non-contact microwave solids flow meter measuring solid particulate flow. The method is particularly suitable for calibration procedures prior to installation into an operating system. The flow meter is very sensitive and may pick up backscatter from dust and/or particulate clouds of the particulate product that builds up in the space above the collected particulate of the delivered product in the collecting bin. Readings that include backscatter from the dust cloud are in excess of the actual flow rate. The invention reduces or eliminates backscatter readings that include the particulate dust cloud by attaching a sheath reflective to backscatter energy and made for example from wire mesh to the delivery end of the output duct. The sheath extends toward the build up of the particulate material. During the calibration procedure, the reflective sheath is continuously moved so that it does not contact the material as it builds up.

20 Claims, 5 Drawing Sheets

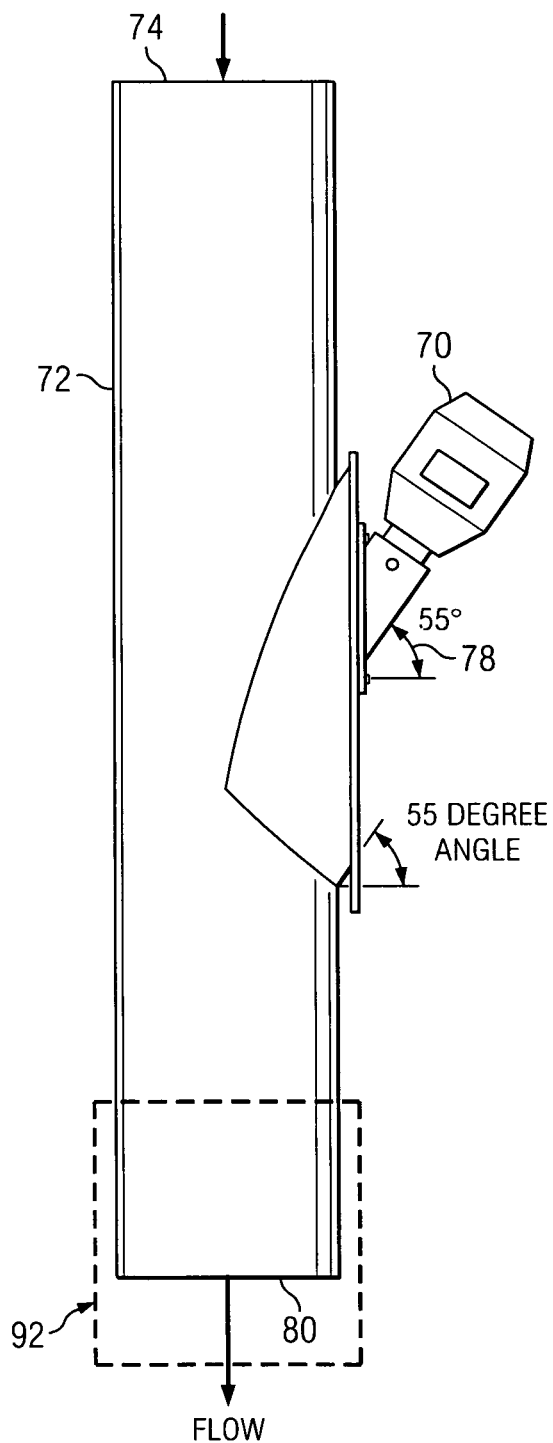
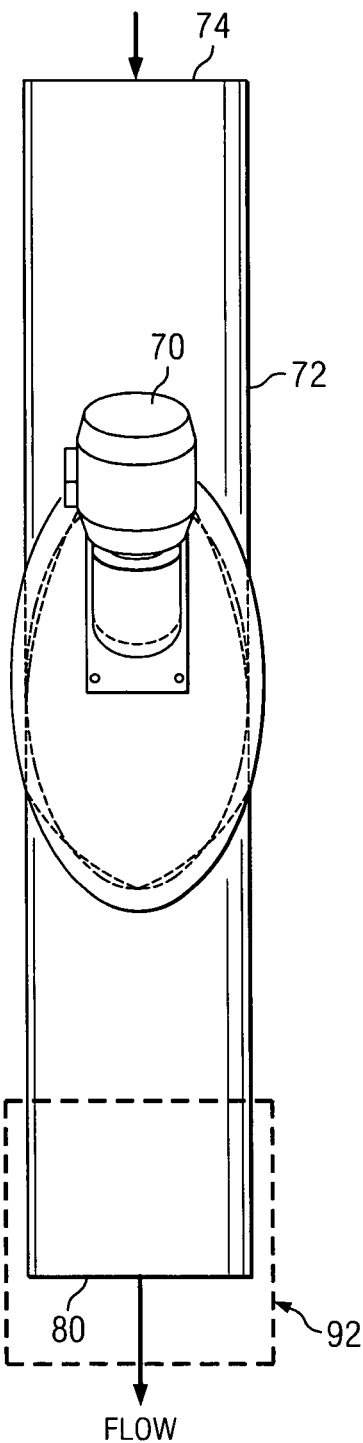
FIG. 8A
FIG. 8B

METHOD FOR ELIMINATING READING ERRORS IN A NON-CONTACT MICROWAVE SOLIDS FLOW METER

TECHNICAL FIELD

This invention relates generally to flow measurement of particulate streams with a non-contact flow meter and in particular to methods for reducing erroneous measurements of particulate streams due to back scatter from a dust and/or particulate cloud formed in the collection bin during the delivery of the particulate material.

BACKGROUND

Flow measurement of particulate streams such as wet cakes, grains, cereals, dry powders, minerals, pharmaceuticals, dairy powders, chemicals, spices, snack foods, cement, resins, plastics, fibrous materials, and others may be critical to the operation and optimization of a given process. A non-contact flow meter may also be of great importance since measurements are obtained without interfering with the flow of product through the process transfer line. A non-contact flow meter is preferred for measuring the flow of some products through transfer lines since any obstruction in the line can cause buildup that may eventually result in a plugged line. In addition, by using a non-contact flow meter there is no degradation of the material since the flow is unobstructed, and the integrity of the process can be maintained. For example, a non-contact solids flow meter obtains measurements during the processing or manufacturing of food and pharmaceuticals without contamination and without compromising of the integrity of the process. There is always a concern about contamination for these type products. As examples only, some typical applications for flow/quantity measurements include, but are not limited to feed to dryers, discharge from dryers, feed to milling operations, material flow to mixers, flow from dust collectors, flow from conveyors, loading/unloading of railcars, trucks, barges and silos, and flow of grains through ducts, cement loading/unloading, flow of plastic granules, flow from cyclones, and feed to reactors.

U.S. Pat. No. 4,091,385, discloses a Doppler radar flow meter in which the flow meter comprises a radar transmitter and receiver that respectively radiates radio waves at a predetermined microwave frequency at least partially through a fluid. At least a portion of the radio waves are backscattered by the particulate matter in the path of the radiated radio waves and are picked up by the receiver. A signal processor connected to the receiver produces a signal related to the Doppler's shift in frequency between the backscattered radio waves and the radiated radio waves such that the frequency is related to the velocity of flow of the substance being measured. In particular, the flow meter is used for velocity of flow of fluids such as blood in conduits (i.e. blood vessels).

U.S. Pat. No. 5,550,537 discloses another apparatus for measuring mass flow rate of a moving medium using Doppler radar. The patent discloses a non-intrusive mass flow rate meter that includes a transceiver that transmits an electromagnetic signal of known frequency and power to illuminate a portion of moving material. The transceiver detects the magnitude and the Doppler shift of the electromagnetic signal that is reflected by material moving along the process flow as it passes through the electromagnetic field established by the signal. The transceiver then combines the magnitude of the reflected electromagnetic signal along with the Doppler shift between the frequency of the transmitted and reflected electromagnetic signals to generate an output signal related to the mass flow rate of the material. However, only a portion of the moving material is illuminated according to the U.S. Pat. No. 5,550,537. This can create errors in the mass flow rate and may provide incorrect readings as to the quantity of material that is passing through the conduit.

U.S. Pat. Nos. 5,986,553 and 6,404,344 were issued to the same inventor as the present invention and disclose an improved flow meter for measuring solid particulate flow rates by radiating the particulate flow path through a conduit such that substantially all of the particulate matter contributes to and forms backscatter energy. The backscatter energy is used to generate an electrical signal that is proportional to the consolidation of solid particulate matter flowing through the conduit. The flow meter described in U.S. Pat. No. '553 is quite sensitive to motion and is normally very accurate for most applications. However, because of its sensitivity to particulate motion, the flow meter is also sensitive to various "motions", other than the particulate material motion, which are often present in a particulate matter distribution system. For example, the motion of a rotating screw conveyor or product dust can be sensed by the system and result in an erroneous indication of the output particulate flow rate. The 6,404,344 patent discloses a technique and method that helps avoid such errors in the calibration of the output flow rate of the particulate material.

SUMMARY OF THE INVENTION

The present invention discloses a method of reducing or eliminating back scatter signals from clouds of particulate dust in the collecting bin picked up by a non-contact mass flow meter which measures the flow of particulate streams through ducts, chutes, or pipes.

The non-contact mass flow meter uses a Doppler-radar sensor, a unique flow tube, a flow rate and totalizer indicator, and an algorithm to convert the sensor output signal to mass flow rate as the solid particulate matter flows along a first hollow conduit. A second hollow conduit, having at least the same diameter as the first conduit, is joined to the first conduit at a selected angle. At least one sensor is associated with the second hollow conduit and includes a transmitter of electromagnetic energy for radiating the entire particulate matter flow path formed by the first conduit such that substantially all of the particulate matter contributes to and forms backscattered energy. A receiver portion of the sensor receives the backscattered energy and generates an electrical signal that is proportional to the concentration of solid particulate matter flowing in the first hollow conduit. A processor is coupled to at least one sensor and generates an output signal representative of the amount of the solid particulate matter.

It is important that the solid particulate matter flows past the sensor at a substantially constant velocity, and such a constant velocity is achieved for most applications with gravity by placing a container or other source of the particulate matter at a predetermined distance above the sensor. Thus, once properly calibrated, the flow meter will continuously provide accurate readings.

Further, although a final calibration of the flow meter may be necessary once it is installed in a system, it is important that the flow meter be reasonably close to calibration conditions when first received by a customer, and before installing in an operating system.

Unfortunately, the differences in the delivery systems at the factory and the actual commercial installation may be significant. This results in very different output readings for the same rate of flow past the sensors. This difference is a result of the build up of a cloud of particulate dust from the particulate material at the exit or delivery end of the first hollow conduit or chute. The present invention solves this problem by including a sheath reflective to microwaves at the exit end of the first hollow conduit or delivery chute. During the initial calibration at the factory, the sheath is continually moved up so as to maintain it close to the top surface of the material, but not touching, as the material collects in the delivery bin. A membrane such as a sightglass or diaphragm (such as for example a teflon diaphragm) is preferably interposed in the second hollow conduit between the flow meter or sensor and the particulate matter to assure that there is no physical contact between the two. It should also be appreciated, of course, that the membrane must be transparent to the microwave energy used by the flow meter. The electrical signal generated by the receiver of the flow meter or sensor is typically a non-linear signal measured in either milliamps or volts. The processor converts the milliamp or volt signal into a mass flow rate such as pounds-per-hour, and a totalizer generates a total quantity value or weight of the material delivered.

According to another embodiment, a central processing unit may be coupled between the receiver and an industrial computer that calculates constants for algorithms for use by the digital signal processor (DSP), dedicated computer or smart indicator. The processor may also include converting circuitry in the central processing unit for converting the mass flow rate to total weight (i.e. pounds or kilograms).

The foregoing has outlined rather broadly the features and technical advantages of the present invention in order that the detailed description of the invention that follows may be better understood. Additional features and advantages of the invention will be described hereinafter, which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which:

FIGS. 8A and 8B illustrate side and front views of another embodiment of the present invention.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Figure 1:
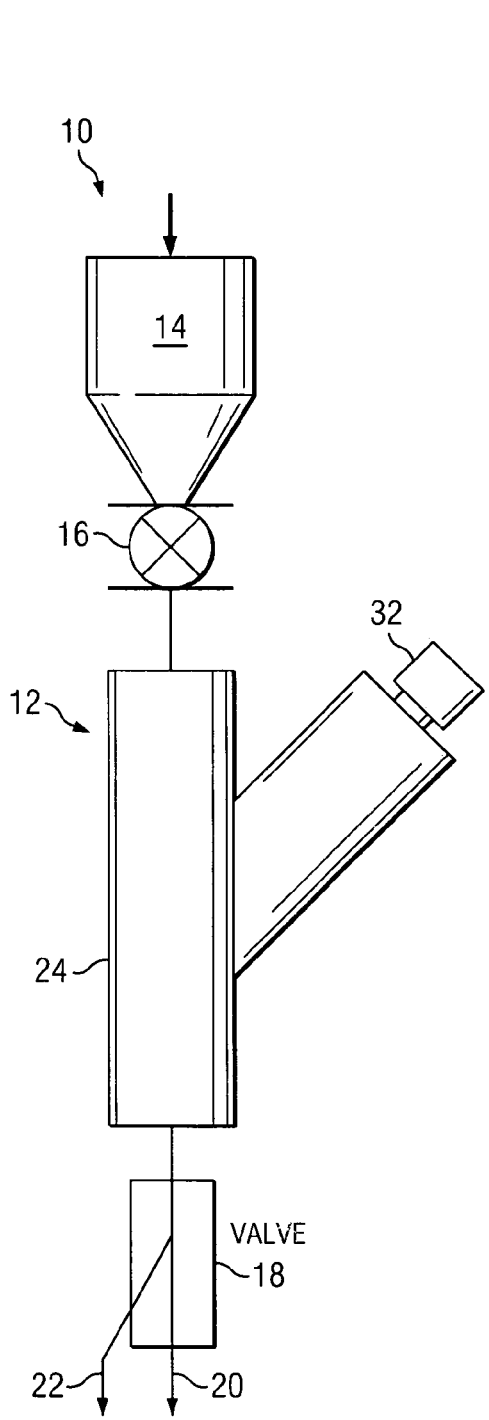
FIG. 1 is a prior art diagrammatic representation of a typical flow meter application for the non-contact mass flow meter in a gravity flow application.

FIG. 1 shows a typical prior art flow meter application for a non-contact mass flow meter 12 with gravity flow. A particulate product such as, for example only, a cereal or grain flows into a product bin 14 and a rotary air lock 16 at the bottom of the bin discharges the particulate material to flow meter 12. The flow meter 12 measures mass rate (such as pounds/hour) and quantity (such as pounds). The product discharged from the bottom of the flow meter 12 may pass through a manual divert valve 18 which enables the product to follow either path 20 or path 22.

It will be noted that, unless other compensation is provided to handle the velocity change, the distance from the solids feed equipment (in this case the rotary air lock 16) to the flow meter 12 should be kept the same for calibration and the actual application or installation into an industrial plant. This ensures that the initial particulate velocities would be nearly identical at the flow meter both during the calibration conditions and the end use conditions under which the meter would finally operate.

It is important that the low-energy microwave beam emitted from a transmitter in sensor 32 as shown in FIGS. 1, 2A, 2B, and 2C cover the entire cross-sectional area of the flow tube 24. In this manner, substantially all particulate materials flowing through the flow tube 24 come in contact with the beam 34 and thus the reflected Doppler-shifted energy picked up by a receiver in the sensor 32 will be a signal representative of all of the solids flowing through the flow tube 24.

Figure 2A:
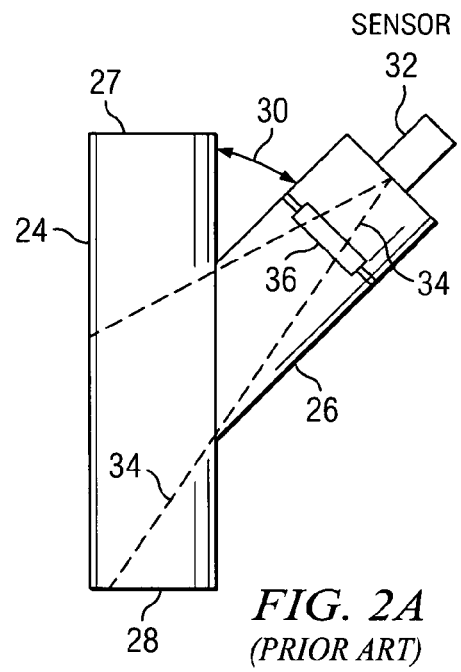
FIG. 2A is a side view of a prior art flow tube and attached sensor tube.
Figure 2B:
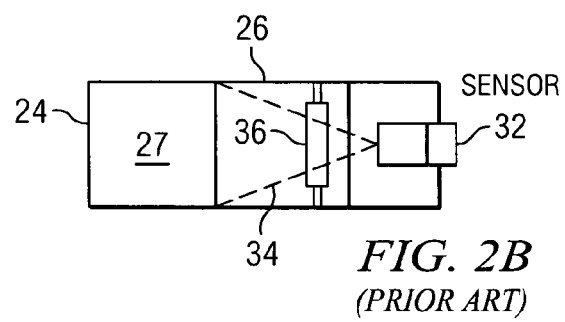
FIG. 2B is a top view of a prior art rectangular flow tube with the sensor tube attached.
Figure 2C:
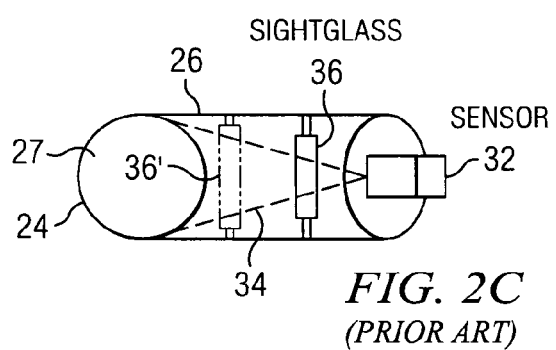
FIG. 2C is a top view of a prior art circular flow tube with a sensor tube attached.
Figure 3:
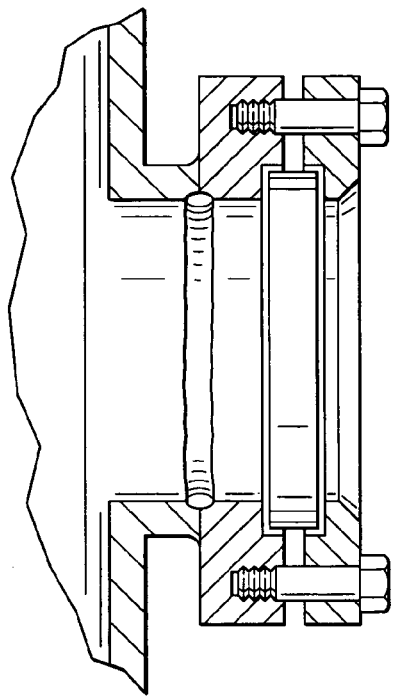
FIG. 3 is a cross-sectional view of a typical sightglass that could be used with the flow meter shown in FIG. 1.

Thus as can be seen in the prior art FIG. 2A, the non-contact solids flow meter flow tube and sensor arrangement 12 comprises the material flow tube 24 having a product inlet 27 and a product outlet 28. Flow tube 24 is attached at an angle 30 to a sensor tube 26 that has a sensor 32 mounted thereon for transmitting the low-energy microwave beam 34 across the entire cross-sectional area of the flow tube 24. As shown in FIGS. 2A, 2B, and 2C, a sight glass, diaphragm, or other membrane 36 that is transparent to the microwave beam 34 may be included between the sensor 32 and the flow tube 24. To avoid the unintended collection of material in the sensor tube 26, angle 30 should vary from about 10 degrees to some value less than 90 degrees. Thus, the flow tube 24 may be vertical as shown or according to some applications maybe at a selected angle to the horizontal. As an example only, for some applications, the sensor tube 26 may be at an angle of 60 degrees to the horizontal. FIGS. 2B and 2C, show a top view of a rectangular flow tube 24 and a circular flow tube 24, respectively. However, the beam 34 from sensor 32 in each embodiment covers the entire cross-sectional area of the flow tube. Thus, the tube 26 holding the sensor 32 is preferably of the same diameter as the flow tube 24. It should also be noted that the sensor 32 in both FIGS. 2B and 2C is located at a distance from the flow tube path that assures the width of beam 34 covers the entire diameter or cross-sectional area of the flow tube. Therefore, a back-reflected Doppler-shifted energy signal will be representative of the entire flow of the solid material. It can be seen then that the sensor 32 must be properly positioned at the right distance from the centerline of flow tube 24 or the beam 34 will either be too narrow to cover all of the material in the flow tube or will be so far away that the maximum energy would not be received from the reflected energy from the flowing material. Also as was discussed above, and as is shown in FIG. 3, there is preferably included a sight glass, diaphragm or other membrane 36 that can pass the microwave energy used by the flow meter to assure that the flow meter 12 is in fact a non-contact flow meter.

In the figures, sensory apparatus 32 illustrates a transceiver. This is a highly satisfactory arrangement that allows for a simple compact installation. That is, both the transmitter of the microwave energy and the receiver that senses the back scatter microwave energy are packaged as a single unit. However, it will be appreciated by those skilled in the art, that the sensor apparatus could comprise a receiver that is packaged as a separate unit from the transmitter. Further, the receiver could be installed at a location that is also separate from the transmitter so long as the received microwave energy is proportional to the total amount of solid particulate material flowing through the flow meter.

Figure 4:
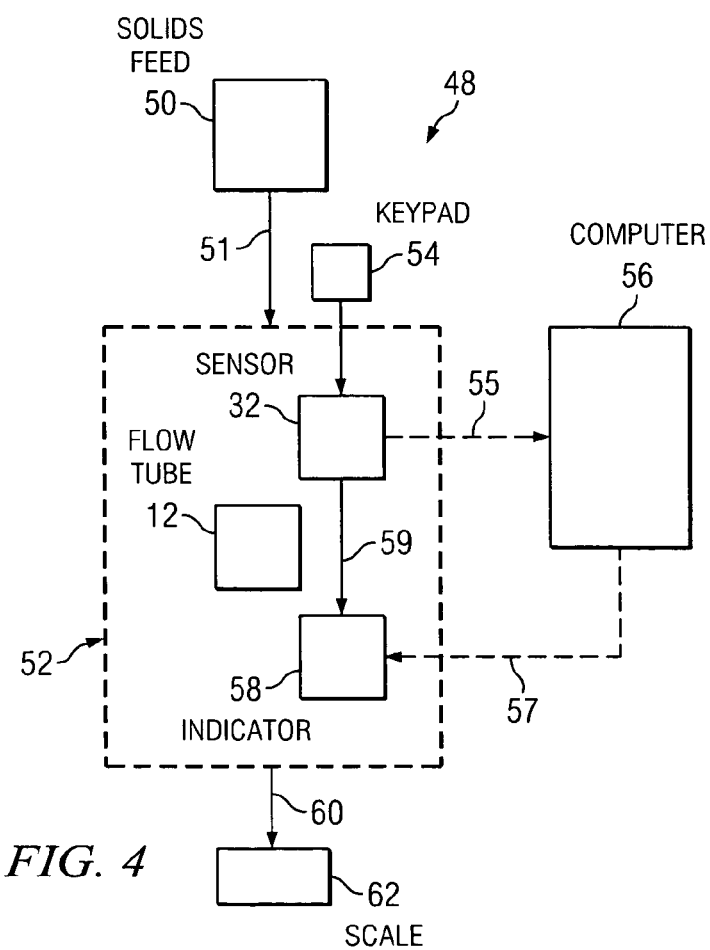
FIG. 4 illustrates the equipment necessary to calibrate the solids flow meter of the flow meter of FIG. 1.

FIG. 4 is a block diagram illustrating a calibration circuit 48 for calibrating the solids flow meter 52 illustrated in dashed lines. This flow meter is of the type discussed above briefly with respect to FIGS. 1, 2A, 2B, and 2C wherein substantially all of the particulate matter can be illuminated by the radar or high frequency beam. A complete discussion of the flow meter is set forth in U.S. Pat. No. 5,986,553 and is incorporated herein in its entirety. As can be seen in FIG. 4, solids feed equipment 50 supplies the particulate solid (mass flow at a constant mass rate to meter 52) through a duct 51. The flow meter 52 is comprised of the flow tube 12, sensor 32, and a dedicated computer, digital signal processor (DSP) or smart indicator 58. During calibration of the flow meter and after its installation in its operating environment or system, the mass flow from the flow meter 52 passes through duct 60 to weigh scale 62 which also measures the mass rate through the flow meter 52 by determining the weight of the particulate matter that collects during a precise period of time. The output of sensor 32 on line 55 is connected to computer 56 and the output of computer 56 is connected back to the dedicated computer 58. Computer 56 analyzes the calibration according to possible algorithms that can be executed on the dedicated computer, digital processor or smart indicator 58. Usually two, and preferably more than two, mass flow rates and associated sensor output data are collected and used to determine what algorithms should be used. Once the calibration procedures have been completed, and the algorithm determined and programmed into the digital processor, dedicated computer or smart indicator 58, the sensor 32 output is connected at 59 to the processor, computer or smart indicator 58 that contains the algorithm. Communication connections 55 and 57 are then disconnected.

As an example only, the sensor 32 could be a Granuflow GMR130 microwave solids flow indicator made by Endress+Hauser or a Model SSI microwave solids flow indicator by Monitor Technologies LLC or equivalent. Computer 56 may be any commercially available personal computer. If a smart indicator 58 is used, it could be an Apollo Intelligent Meter Red Lion Model PAXP0000 or equivalent. The weigh scale 62 could be any typical load cell, weight scale or equivalent. The solids feed equipment 50 could be a hopper with a vibratory feeder or volumetric feeder or mass rate feeder used with a rotary air lock or equivalent. The flow tube 12 has a receiving portion that is kept at a constant distance from the solids feed equipment 50 during the calibration procedure and is maintained at the same fixed or equivalent value for the final commercial installation. Otherwise, adjustments to the algorithm in indicator 58 will be required.

Thus, after calibration, any particulate solid material fed to the flow meter is indicated by sensor 32 and the sensor output on line 59 is sent to the dedicated computer, digital processor or smart indicator 58 which displays mass flow rate (as mentioned above the sensor output is converted to mass flow rate via an algorithm determined from calibration) and the mass quantity is displayed by integrating the mass flow rate over time. The sensor 32 may also include a keypad 54 connected thereto for entering calibration data and providing other controls and/or inputs.

With the equipment of the type as indicated earlier and with the sensor tube being at an angle of about 30 degrees from the vertical with respect to the flow tube as illustrated in FIG. 2A, a vibratory feeder with variable speed controls may be used to keep a constant mass rate through the meter 52.

Thus, in a flow meter such as disclosed in U.S. Pat. No. 5,986,553, the sensor tube has a diameter at least equal to the flow tube, and the microwave beam will have a width at least equal to the flow tube. This allows the beam to contact the entire cross-sectional area of the flow tube and thus all particulate materials flowing through the flow tube will come in contact with the beam and cause reflected energy. The flow tube may be a round, square, or rectangular cross-sectional shape. The signal from the sensor is conditioned by at least one algorithm to relate the sensor output to mass rate and quantity (totalizer).

In the laboratory calibration of a meter, or an initial calibration after manufacture of the flow meter apparatus of the type discussed in U.S. Pat. No. 5,986,553, a fixed or constant particulate solid rate (mass flow rate) of moving particulate material is passed through conduit 24 of the meter and a corresponding sensor output is recorded. This step is repeated until the mass rates corresponding to the sensor's output range is determined.

The total output sensor data and the corresponding mass rate data are then analyzed mathematically (typically by regression analysis such as the method of least squares) to determine which mathematical equations best fit the data. One equation may fit the date over the entire sensor output range accurately or two or more equations may be needed to accurately fit the data over the entire range. Alternately, using three equations, the mass rate Y and the sensor output X could be represented over the entire sensor output range by an algorithm, which uses three equations. A complete discussion of the calibration of the above described mass flow meter is set out in U.S. Pat. No. 6,404,344. This patent is incorporated herein by reference in its entirety.

However, accurately calibrating the flow meter in a laboratory or manufacturing setting, before it is installed in its actual system setting, is not always simple process. There may be difficulty in an initial calibration because the equipment and system used to provide and collect the flowing particulate material in the laboratory or manufacturing setting may be substantially different than the actual operating system in which the meter will be installed. As an example, in an actual commercial operating system, the flow meter will likely be located upstream and at a substantial distance from the exiting end of the delivery chute or duct. Consequently, the formation of a cloud of particulate dust in the collection bin will have little or no effect on the back scatter readings that are picked up by the sensor. On the other hand, an initial calibration after manufacturing is completed may take place at the factory with equipment where the flow meter is only a short distance from the exit end of the delivery chute. Consequently, the inventor has discovered that when the particulate material impacts the bottom of the collection bin or the top surface of a mound of collected material, a cloud of dust of the particular material forms. The formation of this cloud of the dust from the particular material above the mound of material in the collection bin has a significant effect on the back scatter readings picked up by the flow meter. Although the physics are not fully understood, it is believed that the microwaves are reflected from the dust cloud and re-enter the delivery chute. This reflected microwave energy is then picked up as a back scatter readings and is also interrupted as the flowing particular material. This results in unacceptably high readings.

Figure 5:
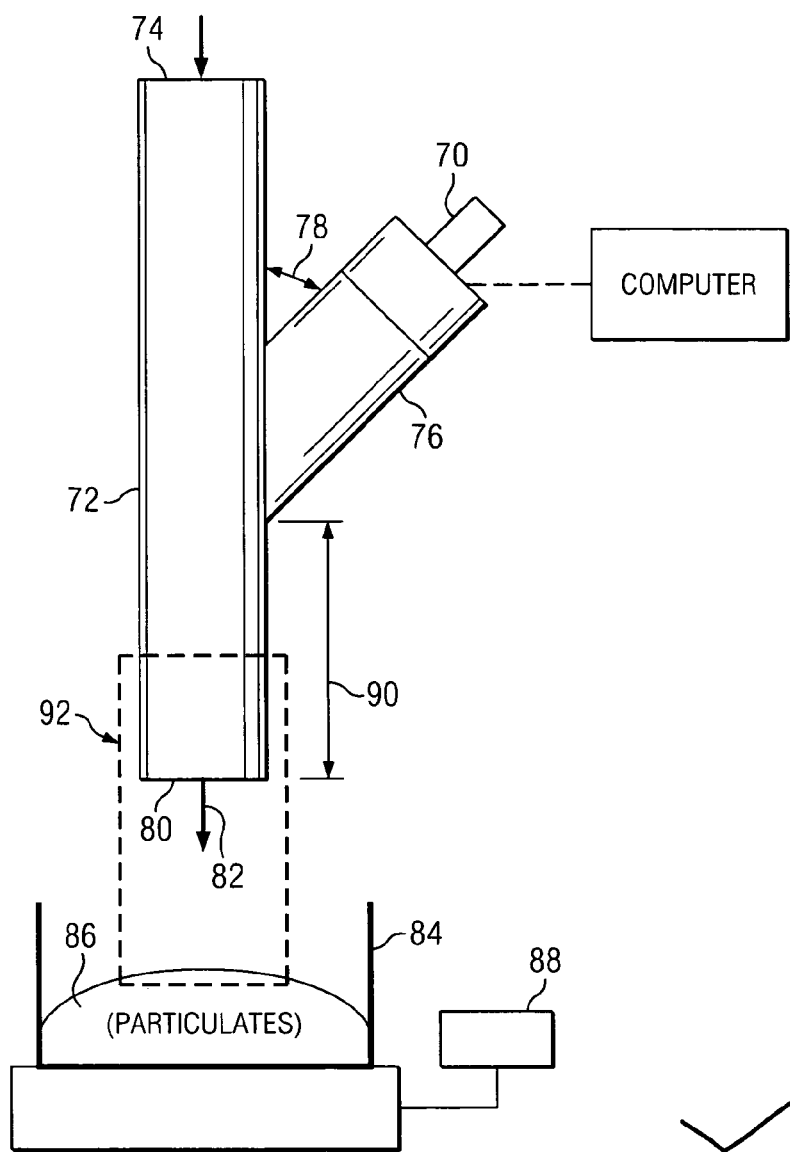
FIG. 5 is a simplified diagram that illustrates the present invention.
Figure 6A:
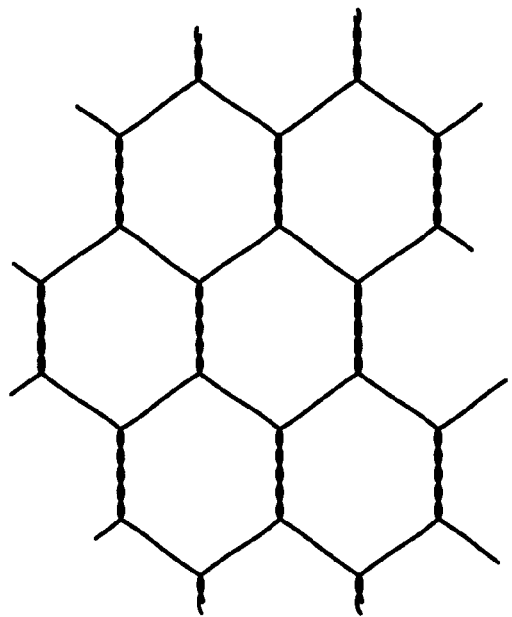
FIGS. 6A, 6B and 6C show types of wire mesh suitable for forming the conductive sheath of the present invention.
Figure 6B:
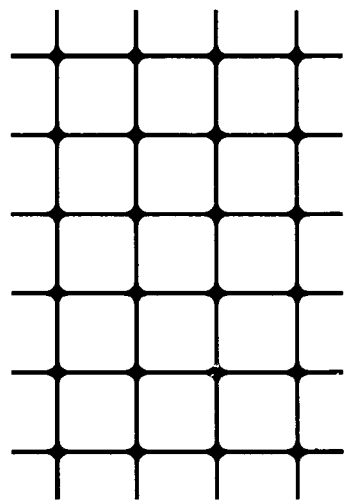
Figure 6C:
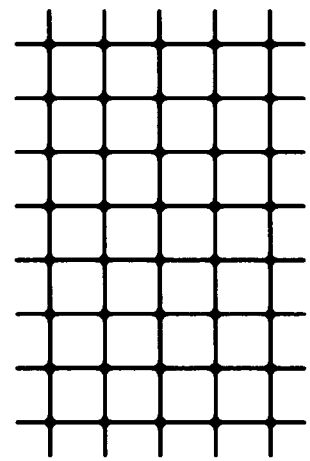

It has been discovered, however, that a conductive or metal sheath reflective to microwave energy and attached to the exit end of the delivery conduit or chute substantially reduces the effect of the dust or particulate cloud. A conductive or metal sheath made from a wire mesh has been found to be particularly effective. Referring now to FIG. 5, there is illustrated a simple diagram of the invention. As shown, there is included an apparatus for calibrating a non-contact doppler microwave flow meter, similar to an actual delivery system discussed with respect to FIGS. 1, 2A, 2B, and 2C. As shown, there is a sensor 70 and a first hollow conduit 72, which receives the flowing particulate material at a top opening 74. The sensor 70 is supported by a second hollow conduit 76, which has a diameter substantially the same as the diameter of conduit 72. Conduit 76 is preferably mounted at an angle to conduit 72 (as indicated by double headed arrow 78) in the same manner as was discussed with respect to FIGS. 1, 2A, 2B, and 2C. Also included is an exit end 80 or delivery portion of the first hollow conduit 72. The flow of particulate material as indicated by arrow 82 exits the conduit 72 and collects in a receiving bin 84. The collected particulate material is indicated as a mound of material 86 in the collection bin 84. There is also shown a scale 88 that weighs the material delivered to the collection bin 84. Thus, the actual flow rate can be calculated, by measuring the total weight of the material over a precise period of time. This calculated value can then be correlated with the output readings of the sensor 70. However, as was discussed above, a dust cloud often forms from the impact of the particulate material on the bottom of the collection bin 84 and/or the top surface of the mound of particulate material 86. Further, since in a laboratory setting the distance between the sensor 70 and the exit end 80 of the delivery chute as indicated by double headed arrow 90 is likely to be substantially shorter than in an operating system, reflection or backscatter of microwave energy from the dust or particulate cloud may be picked up by sensor 70, which then provides an output reading that is substantially higher than would be provided if the backscatter energy was only from the moving particulate material. Therefore, referring again to FIG. 5, there is shown a backscatter screen or sheath 92 that is reflective to the microwave energy used by sensor 70. Sheath 92 slides over the exit end 80 of the first hollow conduit 72. Testing has indicated that screens formed of metal or conductive mesh having openings of about one inch down to about ¼ inch or less are especially effective. FIGS. 6A, 6B, and 6C are examples of metal mesh that have been tested and proven effective. It is also believed that a sheath formed of expanded metal and even a metal sheet having a surface fully perforated with apertures of about an inch or less would also be effective to prevent the undesired microwave energy from re-entering exit end 80 of the delivery chute. That is, the sheath reflects microwaves of the backscatter and stops them from re-entering conduit 72. Preferably, the conductive sheath should have substantially more open area than material.

During the calibration of high flow rates of particulate material, it is important that the sheath 92 continually be moved up and away from the building mound of particulate material so that the flow of material is not impeded. For example, if the sheath is allowed to touch and remain in contact with the mound of material 86, the material cannot flow out of the end, of the sheath, and cannot flow as rapidly as necessary through the mesh. When this happens, the material is flowing so fast that the entire first hollow conduit 72 will quickly be plugged. Therefore, in the illustrated embodiment, the sheath can slide up the delivery end of conduit 72 to prevent plugging of the system. Sliding the sheath may be accomplished manually or automatically. Alternately, the sheath could be fixedly attached to the conduit 72 and the entire delivery chute moved. However, this would require complicated machinery.

Figure 7A:
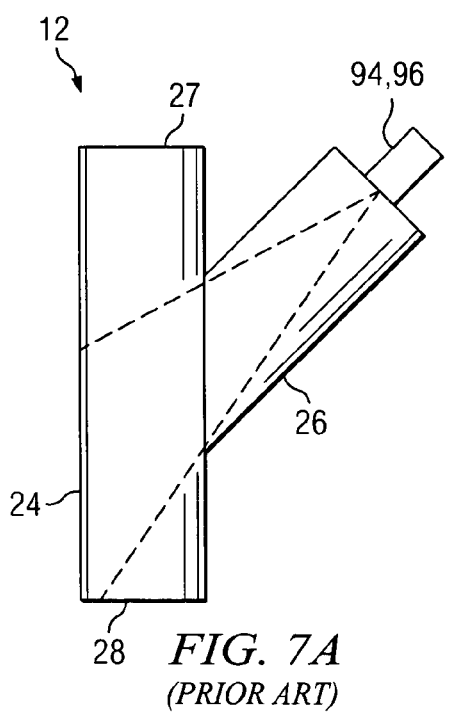
FIG. 7A is a side view of a flow tube utilizing at least two sensors.
Figure 7B:
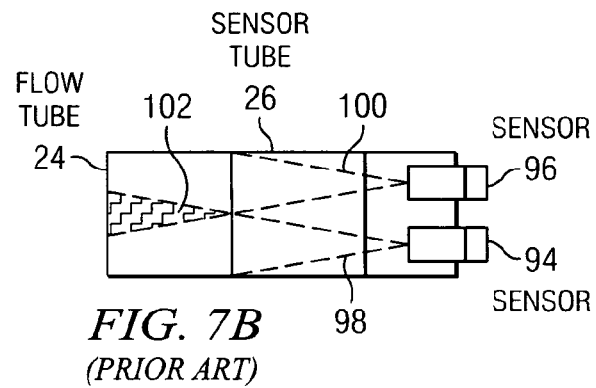
FIG. 7B is a top view of a rectangular flow tube utilizing two sensors.
Figure 7C:
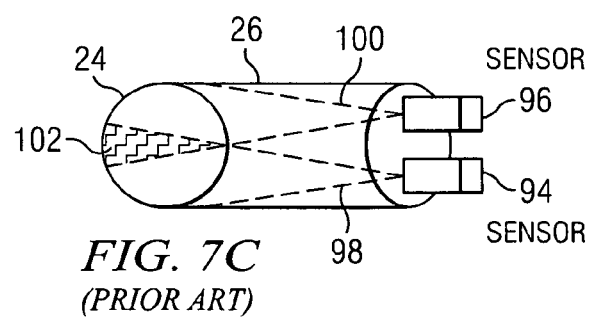
FIG. 7C is a top view of a circular flow tube utilizing two sensors.

Prior art FIGS. 7A, 7B, and 7C disclose an embodiment of the invention using two or more side by side sensors used with the concept disclosed in U.S. Pat. No. 5,986,553. In FIG. 7A, a side view of the flow tube is shown with the beams 98 and 100 being illustrated as one beam in as much as they are parallel and are provided by sensors 94 and 96, only one of which can be seen in the side view in FIG. 7A.

FIG. 7B is a top view of a rectangular flow tube 24 with two sensors 94 and 96 positioned on the sensor tube 26. Sensor 94 generates beam 98 and sensor 96 generates beam 100. It will be noted that the beams 98 and 100 include and overlap area 102. This same overlap area is illustrated in FIG. 7C that is a top view of a circular flow tube. Note that the distance of the sensors 94 and 96 from flow tube 24 is adjusted such that their beams 98 and 100 intersect at the outer periphery of the flow tube to ensure that the entire flow tube is covered by the beams 98 and 100. The two sensors 94 and 96 send out beams 98 and 100 of low microwave energy at the same fixed frequency. The moving particles reflect the energy beams and thereby the receivers at the sensors measure the total reflected Doppler-shifted energy. Since the moving particles create a Doppler-shifted energy that is reflected back to the sensors 94 and 96, the sensors 94 and 96 measure the intensity of the total signal reflected back. An average of the two sensor signals is taken, and the average output from the sensors is mathematically correlated with the total mass rate through the meter. This is substantially similar to the calibration method that uses only one sensor output signal as described above. However, two or more sensors' output an average value that may be used or some weighted average mathematical value of the sensor output signal is used and is correlated with the mass rate. The same on-site adjustment technique discussed above with respect to FIG. 1 is equally applicable to the embodiments discussed with respect to FIGS. 7B and 7C.

FIGS. 8A and 8B show a side and front view respectively of a more compact embodiment of a flow meter of the present invention that can be calibrated before installation into a system. It is important to understand, however, that the beam of microwave energy from sensor cover 70 covers the complete cross-section of the first hollow conduit 72.

Thus, there has been disclosed a compensation technique for eliminating or reducing reading errors from a Doppler-radar flow meter wherein the sensor beam covers the entire cross-sectional area of the flow tube in order that all particulate materials flowing through the flow sectional come in contact with the beam and provide reflected Doppler-shifted energy.

Moreover, the scope of the present application is not intended to be limited to the particular embodiments of the processes, machine, methods and steps described in the specification. As one of ordinary skill in the art will readily appreciate from the disclosure of the present invention, processes, machines, methods, or steps, presently existing or later to be developed, that perform substantially the same function or achieve substantially the same result a the corresponding embodiments described herein may be utilized according to the present invention. Accordingly, the appended claims are intended to include within their scope such processes, machines, manufacture, compositions of matter, means, methods, or steps.

What is claimed is:

1. Apparatus to eliminate back scatter pick up by a flow meter from a cloud of particulate dust at the delivery end of an output duct comprising:
    a first hollow conduit forming a flow path along which solid particulate matter moves and having a delivery end;
    a second hollow conduit joined to the first conduit at an angle;
    at least one sensor apparatus associated with said second hollow conduit, said at least one sensor apparatus including:
        a transmitter of electromagnetic energy for radiating the entire particulate matter flow path formed by said first conduit such that the flowing particulate matter generates back scattered energy; and
        a receiver for receiving such backscattered energy and generating an electrical signal that is proportional to the amount of solid particulate matter flowing in said first hollow conduit;
    a processor coupled to said at least one sensor for generating an output signal representative of the flow rate of said solid particulate matter; and
    a sheath surrounding the delivery end of the first hollow conduit that reflects said back scattered energy to reduce sensing back scatter energy from particulate dust outside of said first hollow conduit at said delivery end.

2. The apparatus of claim 1 wherein said solid particulate matter flows past said sensor at a substantially constant velocity.

3. The apparatus of claim 2 wherein said source of said particulate matter is located a predetermined distance above said sensor for achieving said substantially constant velocity by gravity flow.

4. The apparatus of claim 1 wherein said sheath has substantially more open area than material.

5. The apparatus of claim 1 wherein said sheath is made form one of the group consisting of a wire mesh, expanded metal, and a perforated sheet of metal.

6. The apparatus of claim 1 wherein said sheath is made of a wire mesh having openings no greater than about one inch in diameter.

7. The apparatus of claim 6, wherein said openings are no less than about one quarter of an inch.

8. The apparatus of claim 1 further comprising a membrane transparent to said electromagnetic energy interposed in said second hollow conduit between said sensor and said flow of particulate matter in said first hollow conduit.

9. The apparatus of claim 1 wherein said second conduit is joined to said first conduit at an angle from the vertical in the range of about 10° to less than 90°.

10. The apparatus of claim 9 wherein the preferred angle between said first and second conduits is in the range of about 10° to about 35°.

11. The apparatus of claim 1 wherein the receiver is a Doppler receiver that measures the frequency difference between the transmitted energy and the scattered energy received from the moving particulate matter.

12. The apparatus of claim 1 further comprising a bin for collecting particulate matter flowing from said delivery end of said first hollow conduit.

13. The apparatus of claim 12 wherein said sheath surrounding said delivery end of said first hollow conduit comprises a sliding fit such that said conductive sheath may be moved away from said particulate matter as it collects in said bin.

14. The apparatus of claim 1 wherein said processor includes a memory for storing a first algorithm for converting the signal generated by said receiver in a first range of values to a mass flow rate and storing a second algorithm for converting the signal generated by said receiver in a second continuous range of values to mass flow rate.

15. The apparatus of claim 14 wherein said mass flow rate is indicated in either pounds/hour or kilograms/hour.

16. A flow meter as in claim 14 wherein said processor is selected from the group consisting of a digital processor, a dedicated computer, and a smart indicator.

17. The apparatus of claim 1 wherein said at least one sensor includes:
    first and second sensors associated with said second conduit, each of said sensors comprising:
        a transmitter of electromagnetic energy for radiating at least a first portion of a particulate matter flow path to cause backscattered energy;
        a receiver for receiving the backscattered energy from its transmitter; and
        said processor being coupled to both said first and second sensors for generating said output signal representative of the flow of said particulate matter.

18. The apparatus of claim 1 wherein said processor includes a memory for storing at least one algorithm for converting the signal generated by said receiver into a continuous range of values representative of mass flow rate.

19. A method of measuring mass flow rate of a solid particulate matter comprising the steps of:

flowing the particulate matter through a first hollow conduit, out a delivery end of said first hollow conduit and into a collecting bin;

transmitting electromagnetic energy through a second hollow conduit attached to said first hollow conduit at an angle;

radiating substantially all of said particulate matter in said first conduit with said electromagnetic energy as it passes said second hollow conduit to form a signal from backscattered electromagnetic energy;

receiving said backscattered energy from said particulate matter;

converting said received backscattered energy to mass flow rate;

surrounding said delivery end of said first hollow conduit with a sheath reflective to said backscattered energy and having substantially more open area than material; and blocking said back scattered energy from re-entering said first hollow conduit.

20. In a system for measuring a mass flow rate of particulate matter flowing through a first hollow conduit and out of a delivery end by radiating an entire flow path through said conduit portion with electromagnetic energy such that substantially all of the particulate matter is illuminated by said electromagnetic energy and generates backscatter energy and receives said backscatter energy to generate a signal proportional to the amount of particulate matter flowing in said conduit a method of reducing the re-entry of said backscatter energy into said first hollow conduit at said delivery end comprising the steps of:

collecting said flowing particulate material in a collecting bin;

surrounding said delivery end of said first hollow conduit with a sheath reflective to said backscattered energy and having substantially more open area than material; and moving said sheath away from the top surface of said particulate material as it is collected in said collecting bin.

* * * * *

UNITED STATES PATENT AND TRADEMARK OFFICE
CERTIFICATE OF CORRECTION

PATENT NO. : 7,310,046 B2 Page 1 of 1
APPLICATION NO. : 11/264554
DATED : December 18, 2007
INVENTOR(S) : Young It is certified that error appears in the above-identified patent and that said Letters Patent is hereby corrected as shown below:

In Col. 1, line 33, after compromising, delete "of".
In Col. 4, line 66, delete "maybe" and insert --may be--.
In Col. 7, line 5, after always, insert --a--.
In Col. 7, line 23, delete "particular" and insert --particulate--.
In Col. 7, line 24, delete "particular" and insert --particulate--.
In Col. 7, line 32, delete "particular" and insert --particulate--.
In Col. 7, line 59, delete "calculated," and insert --calculated--.
In Col. 8, line 30, delete "end," and insert --end--.
In Col. 9, line 2, delete "sensors'" and insert --sensors--.
In Col. 9, line 18, delete "sectional" and insert --tube will--.
In Col. 9, line 28, delete "a" and insert --as--.
In Col. 9, line 61, delete "back scattered" and insert --backscattered--.
In Col. 10, line 8, delete "form" and insert --from--.

Signed and Sealed this

Third Day of June, 2008

JON W. DUDAS
*Director of the United States Patent and Trademark Office*